United States Patent [19]
Yanetani et al.

[11] Patent Number: 5,629,036
[45] Date of Patent: May 13, 1997

[54] METHOD FOR PREPARING BAKERY FOOD CONTAINING DIETARY FIBERS

[75] Inventors: Yoshifumi Yanetani, Nara; Naoko Yamashita, Osaka; Kazuyuki Inada, Takarazuka, all of Japan

[73] Assignee: Matsutani Chemical Industries Co., Ltd., Hyogo-ken, Japan

[21] Appl. No.: 866,270

[22] Filed: Apr. 13, 1992

Related U.S. Application Data

[63] Continuation of Ser. No. 713,370, Jun. 12, 1991, abandoned.

[30] Foreign Application Priority Data

Jun. 18, 1990 [JP] Japan .................................. 2-160840

[51] Int. Cl.$^6$ .................................................. A21D 2/36
[52] U.S. Cl. ........................ 426/19; 426/549; 426/496
[58] Field of Search .............................. 426/549, 19, 496

[56] References Cited

U.S. PATENT DOCUMENTS 4,247,568  1/1981  Carrington et al. ................... 426/661

FOREIGN PATENT DOCUMENTS

| 0368451 | 5/1990 | European Pat. Off. . |
| 767755 | 5/1953 | Germany . |
| 281979 | 12/1927 | United Kingdom . |

OTHER PUBLICATIONS

Samuel A. Matz; Formulas and Processes for Bakers, 1987, Pan-Tech International, Inc. pp. 165–167.

*Primary Examiner*—Jeanette Hunter
*Attorney, Agent, or Firm*—Sughrue, Mion, Zinn, Macpeak & Seas

[57] ABSTRACT

A method for producing a bakery food comprising the steps of kneading a wheat flour, baking the kneaded wheat flour after fermentation, the method being characterized by adding indigestible dextrin in the step of kneading.

2 Claims, No Drawings

METHOD FOR PREPARING BAKERY FOOD CONTAINING DIETARY FIBERS

This application is a continuation division of application Ser. No. 07/713,370 filed Jun. 12, 1991, now abandoned.

BACKGROUND OF THE INVENTION

1. Field of the invention

The present invention relates to bakery foods containing dietary fibers.

2. Description of Prior Art

Recent years, it has been made clear that deficiency of dietary fibers is closely related to certain diseases such as cancer, heart disease, cerebral apoplexy, diabetes each ranking high in the causes of death in western countries as well as in Japan, and to diseases such as constipation, varicocele, cholelithiasis. Under such circumstances, various kinds of foods containing dietary fibers have come to be sold on the market in conjunction with the recent change in eating habits. Representative ones among the mentioned foods containing dietary fibers are soft drinks, desserts, teas, starch noodle (glass noodle), soybean curd (tofu), etc. It is, however, hard to take in quantitatively a required amount of dietary fibers from such foods in the eating habits today, and therefore it is desired to prepare daily foods so as to contain quantitatively required amount of dietary fibers. It may be generally said that bakery foods such as bread is certainly suitable to be employed as one of the mentioned dietary fiber foods, but various disadvantages come out when adding the dietary fibers to the bakery foods mainly from the viewpoint of quality.

The dietary fibers are roughly classified into water-soluble dietary fibers and insoluble ones. Cellulose, lignin, hemicellulose A and C, chitin, collagen, etc. belong to the latter. The former is further divided into high molecular materials such as pectin, guar gum, devils-tongue mannan, sodium alginate, carrageenan, agar, carboxymethylcellulose, etc. and low viscosity materials such as indigestible dextrin, polydextrose, etc.

When adding some insoluble dietary fibers to a bakery food such as bread, one who eats the food feels rough to his tongue due to the insolubility, resulting in an undesirable taste. On the other hand, this disadvantage of feeling rough to one's tongue is certainly overcome in the case of water-soluble dietary fibers, but in the group high molecular materials being one of such water-soluble dietary fibers, viscosity is high and water absorption coefficient of "dough" is increased. Accordingly, when adding a high molecular material over 3%, extensibility of dough is reduced thereby causing a difficulty in formation of dough. As a result, it becomes unavoidable to add more water for overcoming such difficulty, which, in turn, brings about a taste different from familiar one, and moreover there arises another problem of increasing water activity and accelerating deterioration (i.e., life of the food).

In the case of adding low viscosity materials, although there is no problem like the addition of high molecular materials, volume of the product obtained is reduced eventually resulting in a disadvantage of tastelessness.

It is expected that dietary fibers perform various useful physiological functions such as reduction of cholesterol, saving the insulin secretion, acceleration of bowels evacuation, saving of harmful objects, etc. and are now occupying a position of 6th nutritive substance. However, due to the change of the eating habit in recent years, amount of dietary fibers taken in from the daily meals has been actually reduced, and hence it is desirable to have meals containing more dietary fibers from the viewpoint of preventive medicine.

SUMMARY OF THE INVENTION

It is, therefore, an object of the present invention to provide a bakery food containing sufficient dietary fibers which is delicious and enables to take in dietary fibers without fail through the daily meals.

In order to accomplish the foregoing object, there is provided in accordance with the invention a method for preparing a bakery food comprising the steps of kneading wheat flour, baking the Kneaded wheat flour after fermentation thereof; wherein indigestible dextrin is added in the mentioned step of kneading, thereby a bakery food containing dietary fibers superior in both taste and quality being achieved. It is preferable that the indigestible dextrin is added during a process of main kneading according to sponge and dough method.

The term "bakery food(s)" used herein means products obtained through the processes of kneading, fermentation and baking of wheat flour employed as main material, and includes various kinds of bread, pizza, yeast doughnut. The "bakery food(s)" includes the mentioned products whose material is partially of some grain flour other than wheat flour such as rice flour, corn flour, buckwheat flour, rye flour, etc. The mentioned baking process includes frying with oil wheat flour employed as main material in known bakery foods. This is, hard wheat flour or semi-hard wheat flour is employed in the invention.

The indigestible dextrin employed in the invention can be produced by several methods as disclosed in Japanese Patent Publication (unexamined) No. 2-100695, Japanese Patent Application No. 63-299308 or Japanese Patent Application No. 63-307194. In effect, any indigestible dextrin can be adopted as far as it is essentially made from pyrodextrin.

More specifically, essential parts of the methods disclosed in the mentioned Japanese Patent Application No. 63-299308 are as follows: (1) a method of preparing dextrin containing dietary fibers comprising the steps of dissolving pyrodextrin into water, and hydrolyzing a solution of pyrodextrin with α-amylase; (2) a method of preparing dextrin containing dietary fibers according to the mentioned item (1), wherein hydrogen is added after the hydrolysis with α-amylase; (3) a method for preparing dextrin containing dietary fibers according to the mentioned item (2), wherein the solution of pyrodextrin is treated with transglucosidase and/or α-amylase after the hydrolysis of α-amylase and before the hydrogenation; and (4) a method for preparing dexitrin containing dietary fibers according to the mentioned item (1) or (3), wherein starch alone or starch mixed with at least one of monosaccharide and oligosaccharide is roasted by conventional method. Preferred embodiments are illustratively described in detail in the specification of the Japanese Patent Application No. 63-299308.

Essential parts of the method disclosed in the mentioned Japanese Patent Application No. 63-307194 are as follows: (1) a method for preparing dextrin containing dietary fibers comprising the steps of hydrolyzing pyrodextrin with α-amylase, hydrolyzing the same with glucoamylase, preparing a highly pure dextrin solution by filtering, decolorization and deionization, separating dietary fiber component by means of a chromatography through strongly acidic cation exchange resin, thereby extracting dietary fibers; (2) a method according to the item (1), wherein the pyrodextrin is hydrolyzed with transglucosidase after the hydrolysis with glucoamylase and before the steps of filtering, decolorizing and deionization; and (3) a method according to the mentioned item (1), wherein hydrogen is added to the dextrin containing dietary fibers prepared by the mentioned method (1) or (2). Preferred embodiments are likewise described in detail in the specification of the Japanese Patent Application No. 63-307194.

The present invention relates essentially to such bakery foods as produced through the processes of kneading, fermentation and baking, and more particularly to a production process of bread. Production process of bread is classified into so-called "straight dough method" and "sponge and dough method" each being carried out according to known process. It is, however, generally said that the latter is more preferable than the former in view of both taste and quality.

In both straight dough and sponge and dough methods, indigestible dextrin is added in the kneading process. To be more specific, in the kneading process of straight dough method, indigestible dextrin is preferably added at the point of time when dough has been formed by about 50 to 80%. In the case of sponge and dough method, indigestible dextrin is preferably added at the point when dough has been formed by about 40 to 70%. If the addition of indigestible dextrin is carried out at any point of time other than the mentioned point, not only volume will be insufficient but also taste will be poor. In this respect, the addition timing of indigestible dextrin shows an extent of formation of dough as compared with the state of formation at the time of completing the kneading process, and guideline can established in such a manner as to know an approximate value of the formation degree of a dough in the form of a ratio with respect to a sum obtained by multiplying a coefficient of kneading speed by a kneading time, said coefficient of kneading speed being classified into low speed 1, middle speed 1.5 and high speed 2. However, this guideline may be different depending upon the type of kneading machine, and therefore such guideline should be appropriately established according to individual type of kneading machine.

It is preferable that addition amount of indigestible dextrin is 1 to 15% by weight, more preferably, 3 to 10% by weight with respect to total amount of material flour in case that wheat flour is totally or partially replaced by other grain flour. If the addition amount is over 15% by weight, taste and volume are both apt to be inferior. On the other hand, if the addition amount is less than 1%, both taste and quality remain unchanged as compared with the conventional foods containing poor dietary fibers, which does not comply with the objective of the invention.

As mentioned above, a bakery food containing dietary fibers, which is superior in the aspect of both taste and quality, is now achieved in accordance with the invention by adding indigestible dextrin essentially made from pyrodextrin in the conventional production process of bakery food, preferably at a very limited point of time therein.

Generally, various additives are added to bakery foods for various purposes, other than secondary materials such as yeast, yeast food, sugar, salt, skim milk powder, oils and fats. For example, emulsifying agents such as glycerine fatty acid ester, sucrose fatty acid ester etc., saccharides such as maltose, sorbitol, starch syrup, etc., polysaccharides such as gellangum, carrageenan, etc., condense milk, egg, vital gluten, flavours, colorant, preservatives, expanding agent are these additives, and they can be appropriately added according to the requirement. It is also preferable to add small amount of dietary fibers other than indigestible dextrin within the restriction of not affecting the quality.

Other objects and advantages of the invention will become apparent in the course of following description.

DESCRIPTION OF THE PREFERRED EMBODIMENT

Described hereinafter are embodiments in accordance with the present invention. Bakery foods obtained were evaluated through sensory test by 10 panelers and specific volume was determined by substitution method. Results of the sensory test were classified into appearance, crumb and taste each being subject to five-step evaluation, and every aspect of controls (i.e., comparative examples to which no dietary fibers were added) were evaluated as getting 0 (i.e., no mark), based on which relative evaluation was carried out.

Following table shows a result of such relative evaluation in the form of average value of total points.

|  | Fairly good | Good | Average | Bad | Fairly bad |
| --- | --- | --- | --- | --- | --- |
| Appearance | 2 | 1 | 0 | −1 | −2 |
| Crumb | 2 | 1 | 0 | −1 | −2 |
| Taste | 2 | 1 | 0 | −1 | −2 |
| Total point of evaluation | 6 | 3 | 0 | −3 | −6 |

Check-points in the evaluation

Appearance: color of baked crust thickness and softness of dough, proportion and symmetry;

Crumb: color of crumb, bubbles formed on sliced surface, thickness of cell walls between bubbles Taste :odor, taste and flavor

EXAMPLE 1 AND COMPARATIVE EXAMPLES 1 TO 2

Breads were produced according to normal process of sponge and dough method on the following blending and kneading conditions. 6 parts by weight of Pine Fiber (produced by Matsutani Chemical Industries Co., Ltd.) were added in the following steps. Table 1 shows evaluation of the breads thus obtained. Breads of comparative examples were produced on the kneading condition of adding no indigestible dextrin in the main kneading (1).

[Blending]

Sponge mixing

| hard wheat flour | 70 parts by weight |
| --- | --- |
| yeast | 2.2 parts by weight |
| yeast food | 0.1 parts by weight |
| water | 40 parts by weight |

Dough mixing

| hard wheat flour | 30 parts by weight |
| --- | --- |
| sugar | 6 parts by weight |
| salt | 2 parts by weight |
| skim milk powder | 2 parts by weight |
| shortening | 5 parts by weight |
| yeast | 0.2 parts by weight |
| water | 24 parts by weight |

[kneading]

| Sponge mixing | 3 min at low speed | 1 min at high speed |
| --- | --- | --- |
| Dough kneading | (1) 3 min at low speed | 3 min at high speed |
|  | (2) 2 min at low speed | 4 min at high speed |

|  |  |  |
|---|---|---|
|  | (2) 3 min at low speed | 4.5 min at high speed |
|  | ⊙ 2 min at low speed | 2.5 min at high speed |
|  | [Addition timing of indigestible dextrin] |  |
| Example 1A | Addition in ⊙ of Dough kneading (1) | At the point when about 47% of dough was formed |
| Example 1B | Addition in ⊙ of Dough kneading (2) | At the point when about 63% of dough was formed |
| Comparative Example 1 | Addition to wheat flour of sponge mixing |  |
| Comparative Example 2 | Addition to wheat flour in dough mixing | At the point when formation degree of dough was 0 |

TABLE 1

|  | Specific volume | Total point |
|---|---|---|
| Control | 4.80 | 0 |
| Example 1A | 4.68 | 2.5 |
| Example 1B | 4.83 | 2.8 |
| Comparative Example 1 | 4.10 | −3.5 |
| Comparative Example 2 | 3.92 | −3.9 |

The mentioned Pine Fiber were produced by the method disclosed in Example 1 of the Japanese Patent Application 63-29908 (Japanese Patent Publication (unexamined) No. 2-145169).

EXAMPLE 2 AND COMPARATIVE EXAMPLE 3 to 4

Breads were produced on the same production conditions as the foregoing Example 1 with the exception of changing addition amount of indigestible dextrin (Pine Fiber). Table 2 shows addition amounts of indigestible dextrin and evaluation of the breads.

TABLE 2

|  | Addition amounts of indigestible dextrin | Specific volume | Total point |
|---|---|---|---|
| Control | 0% | 4.80 | 0 |
| Comparative Example 3 | 2% | 4.77 | −0.3 |
| Example 2A | 4% | 4.62 | 1.7 |
| Example 2B | 8% | 4.72 | 2.6 |
| Example 2C | 13% | 4.58 | 1.0 |
| Comparative Example 4 | 17% | 4.33 | −1.9 |

EXAMPLE 3 AND COMPARATIVE EXAMPLE 5

Breads were produced according to normal process of straight dough method on the following blending and kneading conditions. 5 parts by weight of indigestible dextrin were added in the following steps. Table 3 shows evaluation of the breads obtained. In the control, no indigestible dextrin was added but following the kneading condition (1).

[Blending]

| hard wheat flour | 100 parts by weight |
|---|---|
| sugar | 4 parts by weight |
| salt | 2 parts by weight |
| shortening | 3 parts by weight |
| yeast | 2 parts by weight |
| yeast food | 0.1 parts by weight |
| skim milk powder | 1 parts by weight |
| water | 65 parts by weight |

[Kneading]

|  |  |  |  |
|---|---|---|---|
| (1) | 4 min at low speed |  | 2 min at high speed |
| ⊙ | 3 min at low speed |  | 3 min at middle speed |
|  | 1 min at high speed |  | 1 min at middle speed |
| (2) | 4 min at low speed |  | 2 min at high speed |
|  | 3 min at middle speed | ⊙ | 3 min at low speed |
|  | 1 min at high speed |  | 1 min at middle speed |

[Addition process of indigestible dextrin]

| Example 3 | Addition in ⊙ of dough mixing (2) | At the point when about 66% of dough was formed |
|---|---|---|
| Comparative Example 5 | Mixed with wheat flour as material | At the point when formation degree of dough was 0 |

TABLE 3

|  | Specific volume | Total point |
|---|---|---|
| Control | 4.70 | 0 |
| Example 3 | 4.58 | 1.5 |
| Comparative Example 5 | 3.63 | −4.7 |

EXAMPLE 4

Breads were produced according to normal process of sponge and dough method on the following blending and kneading conditions. 7 parts by weight of indigestible dextrin prepared according to the method disclosed in the Japanese Patent Publication (unexamined) No. 2-100695 was added in the steps ⊙ of the following kneading conditions. Table 4 shows evaluation as compared with the control to which no indigestible dextrin was

[Blending]

Sponge mixing

| hard wheat flour | 70 parts by weight |
|---|---|
| yeast | 2.5 parts by weight |
| yeast food | 0.1 parts by weight |
| water | 40 parts by weight |

Dough mixing

| hard wheat flour | 30 parts by weight |
|---|---|
| sugar | 5 parts by weight |
| salt | 2 parts by weight |
| shortening | 4 parts by weight |
| margarine | 4 parts by weight |
| skim milk powder | 2 parts by weight |
| egg | 7 parts by weight |
| yeast | 0.2 parts by weight |
| water | 18 parts by weight |

[Kneading]

Sponge mixing:

3 min at low speed;      1 min at high speed;

Dough mixing:

|  |  |  |  |
|---|---|---|---|
| (1) | 3 min at low speed; |  | 2 min at middle speed; |
|  | 2 min at high speed; | ⊙ | 2 min at low speed; |
|  | 2 min at middle speed; |  | 1 min at high speed; |

EXAMPLE 5

Breads were produced in the same manner as Example 4 with the exception that 5.5 parts by weight of following indigestible dextrin was added. Table 4 shows evaluation thereof.

[Indigestible dextrin employed in Example 5]

10 kgs of pyrodextrin ("Arabix #7" produced by Matsutani Chemical Industries) were dissolved into 20 kgs of water with pH adjusted to 5.5, then 0.2% by weight of a-amylase ("Klaistase KD" produced by Daiwa Chemical) was added to the solution for reaction at 85 °C. for one hour. Thereafter reaction with amylase was stopped while keeping the solution temperature at 120° C. for 15 minutes, then the temperature was decreased to 55° C. with pH adjusted to 4.5, and 0.1% by weight of glucoamylase (Gluczyme NL 4.2 by Amano Seiyaku) was added for saccharification for 36 hours. At this point, pH was adjusted to 3.5 and reaction with glucoamylase was stopped. Then, the solution was refined with the use of activated charcoal and ion exchange resins, and concentrated to obtain 1.5 kg of 50% solution. This solution was composed of 51.2% glucose, 2.2% dissaccharide, 3.9% trisaccharide, and 42.8% tetrasaccharide and higher oligosaccharides. 100 ml of this solution was put to pass through a column filled with alkali metal type strongly acidic cation exchange resin XFS-43279.00 (produced by Dow Chemical Japan) at SV=0.25, then water was put to pass therethrough, whereby a high molecular weight dextrin was extracted. Saccharide component of this dextrin was composed of 4.4% glucose, 1.2% disaccharide, 1.7% trisaccharide and 92.1% tetrasaccharide and higher oligosaccharides, and it was recognized through a quantitative analysis by Prosky AOAC method that content of the dietary fiber was 83.9%.

TABLE 4

|  | Specific volume | Total point |
|---|---|---|
| Control | 4.73 | 0 |
| Example 4 | 4.71 | 2.5 |
| Example 5 | 4.66 | 2.2 |

What is claimed is:

1. A method for producing a yeast-leavened bakery food, wherein the bakery food is produced by a sponge and dough method in which there is a sponge stage and a dough stage, comprising the steps of (a) kneading a wheat flour;
   (b) adding indigestible dextrin during the kneading, wherein the indigestible dextrin added to the wheat flour is in an amount of 3 to 15% by weight, wherein the adding of the indigestible dextrin is carried out in a dough kneading step of the dough stage, and further provided that the indigestible dextrin is added at a point of time when dough formation is about 50 to 80%; and
   (c) baking the kneaded wheat flour after fermentation thereof.

2. The method of claim 1 for producing a yeast-leavened bakery food, wherein the indigestible dextrin is added at a point of time when dough formation is about 40 to 70%.

* * * * *